E. J. BUSHEY.
SPRING SUSPENSION FOR VEHICLES.
APPLICATION FILED NOV. 15, 1919.
1,347,494.
Patented July 27, 1920.
2 SHEETS—SHEET 1.
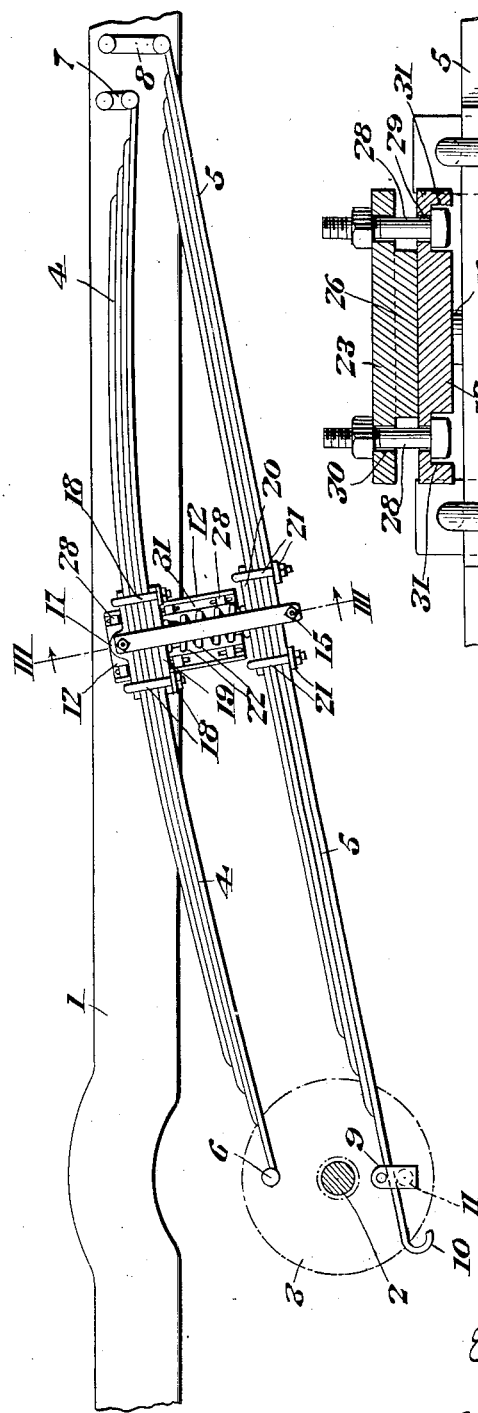
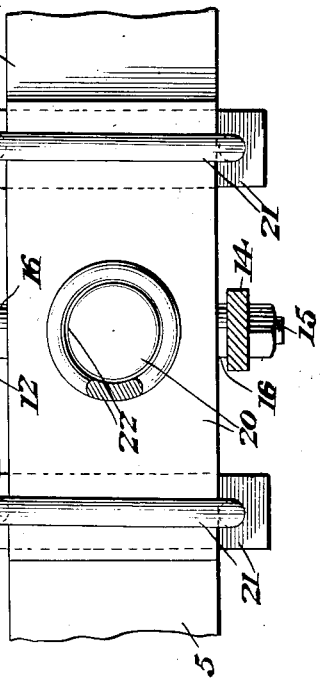
Inventor
Eli Jay Bushey
By
Attorneys

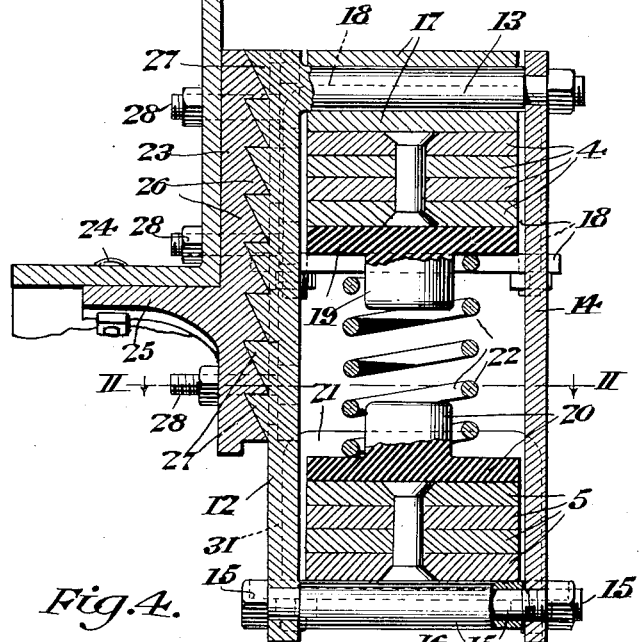
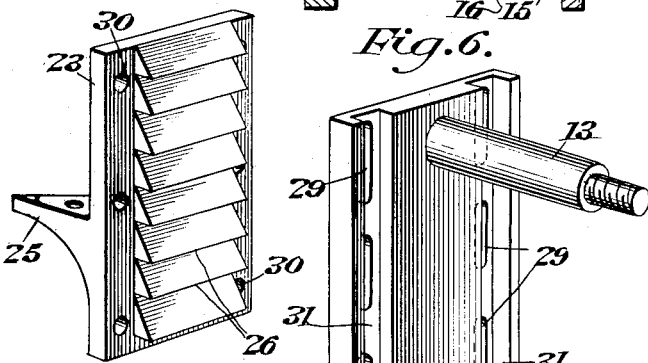
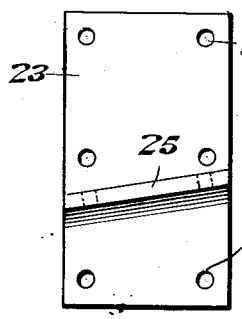
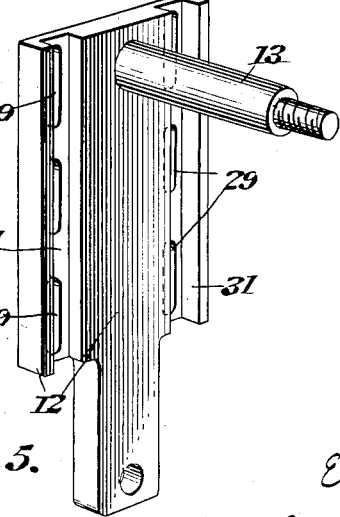
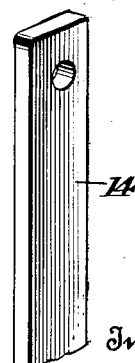

UNITED STATES PATENT OFFICE.

ELI JAY BUSHEY, OF NEW YORK, N. Y.

SPRING SUSPENSION FOR VEHICLES.

1,347,494.  Specification of Letters Patent.  Patented July 27, 1920.

Application filed November 15, 1919. Serial No. 338,339.

*To all whom it may concern:*

Be it known that I, ELI JAY BUSHEY, a citizen of the United States, and resident of the borough of Manhattan, city, county, and State of New York, have invented certain new and useful Improvements in Spring Suspensions for Vehicles, of which the following is a specification.

This invention relates to improvements in spring suspensions for vehicles, and more particularly to spring means connecting the chassis of a motor vehicle with the rear axle.

The invention has for its principal object the provision of means whereby the chassis or frame of a vehicle and the springs interposed between the frame and the rear axle may be adjusted relatively to each other to level the frame.

A further object of the invention is to provide a spring suspension for motor vehicles embodying a pair of leaf springs located at opposite sides of the vehicle and each connected at one end to the chassis and at the other end to the rear axle housing or bolster, and independently adjustable means connecting said springs intermediate their ends with the chassis whereby either side of the chassis may be adjusted vertically to compensate for variation in tension between the springs.

Another object of the invention is to provide a compound spring suspension means of the cantaliver type.

Another object of the invention is to provide a compound spring suspension of the cantaliver type having means for pivotally connecting the main spring intermediate its ends with the chassis, and for guiding the counter spring vertically, said means being adjustable in an up-and-down direction to vary the angular relation between the chassis and the main and counter springs without varying the relation of the springs to each other.

In the drawings, Figure 1 is a fragmentary side elevation showing the improved suspension applied to a motor vehicle;

Fig. 2 a horizontal section on the line II—II of Fig. 3;

Fig. 3 an enlarged vertical section on the line III—III of Fig. 1; and

Figs. 4 to 7 detail views of parts of the adjustable connection between the spring suspending means and the chassis.

Referring to the various parts by numerals, 1 designates one of the side bars of the chassis of a motor vehicle which may be of any suitable construction; 2 designates the usual rear axle of the vehicle, and 3 designates the usual non-rotating disk-like brake-supporting portion of the axle housing located at the inner side of the usual brake drum.

Each of the disk-like portions 3 at the ends of the axle housing is connected with the adjacent side bar of the chassis by a compound spring suspension means, each of which comprises a main multiple-leaf spring 4 and a counter or supplemental multiple-leaf spring 5. The main leaf spring 4 is semi-elliptic, as shown, and is secured at its rear end at 6 to the axle housing 3, and connected at its forward end to the free lower end of the usual swinging shackle 7 pivotally held to the side bar 1 of the chassis. The counter spring 5 is normally straight and is not placed under tension until the spring 4 has flexed a predetermined extent. The spring 5 is connected at its forward end to a pivoted shackle 8 held to side bar 1, and the rear end of the lower leaf of said spring extends loosely through a keeper 9 mounted on the housing 3 and rests on a roller 11 journaled in the keeper. The rear end of this lower leaf is bent to form a hook 10 to prevent the rear end of spring 5 from being pulled out of the keeper 9 when the spring is flexed.

The main spring 4 is pivotally supported midway its ends in a vertically adjustable saddle or support. This adjustable support comprises an inner plate or member 12 formed at its upper end with an outwardly projecting stub shaft or integral pivot bolt 13 having a reduced threaded outer end portion extending through an aperture in an outer member or plate 14. The upper end of the plate 14 is held on the pivot bolt 13 by a suitable nut, and the lower ends of the members 12 and 14 are connected by a bolt 15 having a rotatable sleeve 16 mounted thereon upon which the spring 5 normally rests. The leaves of spring 4 are clamped against a pressure block 17, pivotally mounted intermediate its ends on the bolt or shaft 13, by means of a pair of yokes or box clips 18 which also serve to clamp a rubber bumper 19 against the under side of said spring. A rubber bumper 20 is clamped upon the upper side of spring 5, beneath the bumper 19, by means of a pair of yokes or box clips 21. A coil spring 22 is interposed between the bumpers 19 and 20, with the circular raised impact-receiving portions of the bumpers projecting within the end convolutions thereof.

The saddle or support is adjustable bodily up and down relatively to the side bar 1 of the chassis, and is rigidly secured in adjusted position against the outer face of a bracket 23. The bracket 23 is fixed to the side bar 1 at an angle to said side bar, by means of rivets or bolts 24 which pass through a flange or projection 25 formed on the inner side of said bracket and extending diagonally across the bracket. The adjacent faces of the bracket 23 and the plate 12 are provided with coöperating sets of projections or teeth 26 and 27, respectively, adapted to interlock with each other. The plate 12 is clamped against the bracket 23 in its vertically adjusted position by means of a series of bolts 28 which pass through vertically elongated slots 29 in the plate 12 and through apertures 30 in the bracket 23, the heads of the bolts lying in vertically extending grooves 31 in plate 12. It will be obvious that if the chassis should list to one side owing to inequality in the strength of the spring suspension devices at opposite sides of the vehicle, one of the saddles may be adjusted up or down, as required, to level the chassis, by loosening the nuts on the inner ends of bolts 28 sufficiently to permit the teeth 27 on plate 12 to be disengaged from teeth 26 on bracket 23, whereupon the saddle may be shifted up or down and the nuts on bolts 28 then tightened to clamp plate 12 of the saddle against the bracket in its adjusted position. The slots 29 are made of sufficient length to permit the necessary relative vertical movement between the plate 12 and bolts 28.

The saddle serves not only as a vertically adjustable pivotal support for the center of the main spring 4, but also serves as a guide for the counter or auxiliary spring 5. The coil spring 22 is comparatively weak and is designed merely to resist upward movement of spring 5 due to jolting of the vehicle, and thus prevent chattering of the spring 5 on roller 16 when the vehicle is running with a light load. It will be obvious that if the load is sufficient to flex the spring 4 until bumper 19 bears on the bumper 20, the spring 5 will then be placed under tension and assist in supporting the load.

What I claim is:

1. A spring suspension for motor vehicles comprising a semi-elliptic main leaf spring connected at its ends with the frame and rear axle housing of the vehicle, an auxiliary leaf spring located under the main spring and spaced therefrom, said auxiliary spring being shackled at one end to the vehicle frame and having a sliding connection at its other end with the rear axle housing, a saddle held to the frame and surrounding said springs midway the ends thereof, said main spring being pivotally supported in the saddle and the auxiliary spring being free to move endwisely and vertically relatively to the saddle, and means controlled by the flexing of the main spring to a predetermined extent for placing the auxiliary spring under tension.

2. A spring suspension for motor vehicles comprising a semi-elliptic main leaf spring connected at its ends with the frame and rear axle housing of the vehicle, an auxiliary leaf spring located under the main spring and spaced therefrom, said auxiliary spring being shackled at one end to the vehicle frame and having a sliding connection at its other end with the rear axle housing, a saddle held to the frame and surrounding said springs midway the ends thereof, said main spring being pivotally supported in the saddle and the auxiliary spring being free to move endwisely and vertically relatively to the saddle, and means controlled by the flexing of the main spring to a predetermined extent for placing the auxiliary spring under tension, and means whereby the saddle may be adjusted up and down relatively to the vehicle frame.

3. The combination with a motor vehicle having a rear spring suspension of the cantaliver type, of means for adjusting the intermediate support of the spring suspension up and down relatively to the body of the vehicle.

4. The combination with the chassis and rear axle housing of a motor vehicle, of a semi-elliptic spring connected at its forward end to the chassis and at its rear end with the rear axle housing, and means held to the chassis and adjustable up and down relatively thereto for pivotally supporting the spring intermediate its ends.

This specification signed this thirty-first day of October, A. D. 1919.

ELI JAY BUSHEY.